(12) United States Patent
Gangadhar et al.

(10) Patent No.: US 11,067,494 B2
(45) Date of Patent: Jul. 20, 2021

(54) MULTIDIMENSIONAL MICROFLUID FOCUSING DEVICE

(71) Applicants: INDIAN INSTITUTE OF SCIENCE, Karnataka (IN); DEPARTMENT OF BIOTECHNOLOGY, New Delhi (IN)

(72) Inventors: Eluru Gangadhar, Karnataka (IN); Sai Siva Gorthi, Karnataka (IN)

(73) Assignees: INDIAN INSTITUTE OF SCIENCE, Karnataka (IN); DEPARTMENT OF BIOTECHNOLOGY, New Delhi (IN)

( * ) Notice: Subject to any disclaimer, the term of this patent is extended or adjusted under 35 U.S.C. 154(b) by 95 days.

(21) Appl. No.: 16/333,653

(22) PCT Filed: Sep. 15, 2017

(86) PCT No.: PCT/IN2017/050399
§ 371 (c)(1),
(2) Date: Mar. 15, 2019

(87) PCT Pub. No.: WO2018/051367
PCT Pub. Date: Mar. 22, 2018

(65) Prior Publication Data
US 2019/0257738 A1 Aug. 22, 2019

(30) Foreign Application Priority Data
Sep. 15, 2016 (IN) .............................. 201641031489

(51) Int. Cl.
*G01N 15/14* (2006.01)
*B01L 3/00* (2006.01)
*G01N 15/10* (2006.01)

(52) U.S. Cl.
CPC .... *G01N 15/1484* (2013.01); *B01L 3/502715* (2013.01); *B01L 3/502776* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,120,770 B2 * | 2/2012 | Huang | G01N 21/6458 356/246 |
| 2004/0043506 A1 * | 3/2004 | Haussecker | B01L 3/502707 436/180 |

(Continued)

FOREIGN PATENT DOCUMENTS

| | | |
|---|---|---|
| GB | 2392397 A | 3/2004 |
| WO | 2016050837 | 4/2016 |

OTHER PUBLICATIONS

Eluru G, Julius LA, Gorthi SS. Single-layer microfluidic device to realize hydrodynamic 3D flow focusing. Lab Chip. Oct. 18, 2016; 16(21):4133-4141. doi: 10.1039/c6lc00935b. PMID: 27714001. (Year: 2016).*

(Continued)

*Primary Examiner* — Violeta A Prieto
(74) *Attorney, Agent, or Firm* — Mark M. Friedman

(57) ABSTRACT

A multi-dimensional micro fluid focussing device. The device includes an apparatus for multi-dimensional micro fluid focussing. The device also includes an analyser for analysing the focused fluid. The apparatus includes a micro-channel having an inlet defining a first region, a middle region and an outlet defining a second region. A first junction is formed at the intersection of the first region and the middle region. A second junction is formed at the intersection of the middle region and the second region. A first sheath positioned proximal to the first junction and a second sheath positioned at the second junction. The junctions formed, along with the positioning of the sheaths enable the multi-dimensional focusing of the fluid. The analyser includes a (Continued)

holder for removably retaining the apparatus. A microscope is positioned across the holder. A recording unit is coupled to the microscope.

11 Claims, 10 Drawing Sheets

(52) U.S. Cl.
CPC ..... *G01N 15/1404* (2013.01); *G01N 15/1459* (2013.01); *B01L 2300/0851* (2013.01); *G01N 2015/1006* (2013.01); *G01N 2015/1413* (2013.01)

(56) References Cited

U.S. PATENT DOCUMENTS

| | | | |
|---|---|---|---|
| 2009/0066936 A1 | 3/2009 | Huang | |
| 2009/0201504 A1* | 8/2009 | Ho | B01L 3/502776 356/399 |
| 2015/0024476 A1 | 1/2015 | Butler et al. | |
| 2017/0299492 A1* | 10/2017 | Rindorf | B01L 3/502746 |
| 2017/0304827 A1* | 10/2017 | Yuan | B01L 3/502776 |
| 2019/0134633 A1* | 5/2019 | Bharadwaj | G01N 1/28 |

OTHER PUBLICATIONS

Genni Testa, Gianluca Persichetti, and Romeo Bernini, "Micro flow cytometer with self-aligned 3D hydrodynamic focusing," Biomed. Opt. Express 6, 54-62 (2015) (Year: 2015).*

N. Selamat, M. S. B. Rahim and A. A. Ehsan, "Effect of microchannel sizes on 3D hydrodynamic focusing of a microflow cytometer, "2016 IEEE International Conference on Semiconductor Electronics (ICSE), Kuala Lumpur, Malaysia, 2016, pp. 109-112, doi: 10.1109/SMELEC.2016.7573603. (Year: 2016).*

Testa Genni et al, "Micro How cytometer with 3D hydrodynamic focusing", Frontiers in Biological Detection, vol. 8212, No. 1, Jan. 30, 2012 (Jan. 30, 2012), pp. 1-7.

Kim Y W et al, "Three-dimensional focusing of red blood cells in microchannel flows for bio-sensing applications", Biosensors and Bioelectronics, Elsevier BV, NL, vol. 24, No. 12, Aug. 15, 2009 (Aug. 15, 2009), pp. 3677-3682.

* cited by examiner

MULTIDIMENSIONAL MICROFLUID FOCUSING DEVICE

FIELD OF INVENTION

The invention generally relates to the area of fluidic designs and methods such as flow cytometry for flow focusing of particles.

BACKGROUND

Fluid flow focusing technologies that are currently available to 3D flow focus the particles in flow, each possessing its own disadvantages. The fluid flow focusing techniques can be broadly classified into sheath dependent and sheath independent techniques. Sheath-free techniques that are based on dielectrophoresis, DEP, phenomenon in general involve complex fabrication of electrodes and are predominantly applicable for low flow rates of about 1 I/hr. Sheath based techniques in general do not have a limitation on flow rates. One such sheath based technique known in the prior art discloses a 3D hydrodynamic focusing using a micro fluid device. The microfluidic device comprises of inlets for a sample flow and an out-of-plane focusing sheath flow. A curved channel section is configured to receive the sample flow. The curved channel section provides an out-of-plane focusing sheath. Further, the curved channel section provides hydrodynamic focusing of the sample flow in an out-of-plane direction, the out-of-plane direction being normal to a plane including the curved channel. One significant disadvantage of the 3D hydrodynamic focusing microfluidic device is the complexity of fabrication. Further, another disadvantage is the limitation on flow rate due to the curvature of the microfluidic channel and inertial effects of fluid. Hence, there is a need for a fluid focusing system that has an ease of fabrication and capable of handling wide variety of flow rates.

BRIEF DESCRIPTION OF DRAWINGS

So that the manner in which the recited features of the invention can be understood in detail, some of the embodiments are illustrated in the appended drawings. It is to be noted, however, that the appended drawings illustrate only typical embodiments of this invention and are therefore not to be considered limiting of its scope, for the invention may admit to other equally effective embodiments.

FIG. 8 (b) illustrates a graph of effect of normal average inflow velocity ratio of the first sheath with respect to sample on tightness of focusing, according to an example of the invention.

FIG. 9 (b) illustrates a graph of variation of a line of focusing with respect to normal average inflow velocity ratio of second sheath with respect to sample, according to another example of the invention.

FIG. 10 (b) illustrates a histogram representing a variation of a focusing depth of cells along y-direction with respect to a mean plane of focusing of the cells, according to an example of the invention.

SUMMARY OF THE INVENTION

One aspect of the invention provides a multi-dimensional micro fluid focussing device. The device includes an analyser unit and an apparatus for multi-dimensional micro fluid focussing. The apparatus includes a microchannel having an inlet defining a first region, a middle region and an outlet defining a second region. A first junction is formed at the intersection of the first region and the middle region. A second junction is formed at the intersection of the middle region and the second region. A first sheath positioned proximal to the first junction and a second sheath positioned at the second junction. The junctions formed, along with the positioning of the sheaths enable the multi-dimensional focusing of the fluid.

DETAILED DESCRIPTION OF THE INVENTION

Various embodiments of the invention provide a multi-dimensional micro fluid focussing device. The device includes an apparatus for focusing the fluid. An analyser unit is coupled to the apparatus for analysing the focused fluid. The apparatus includes a microchannel having an inlet defining a first region, a middle region and an outlet defining a second region. A first junction is formed at the intersection of the first region and the middle region. A second junction is formed at the intersection of the middle region and the second region. A first sheath positioned proximal to the first junction and a second sheath positioned at the second junction. The junctions formed, along with the positioning of the sheaths enable the multi-dimensional focusing of the fluid. The apparatus described briefly herein shall be explained in detail.

Figure 1:
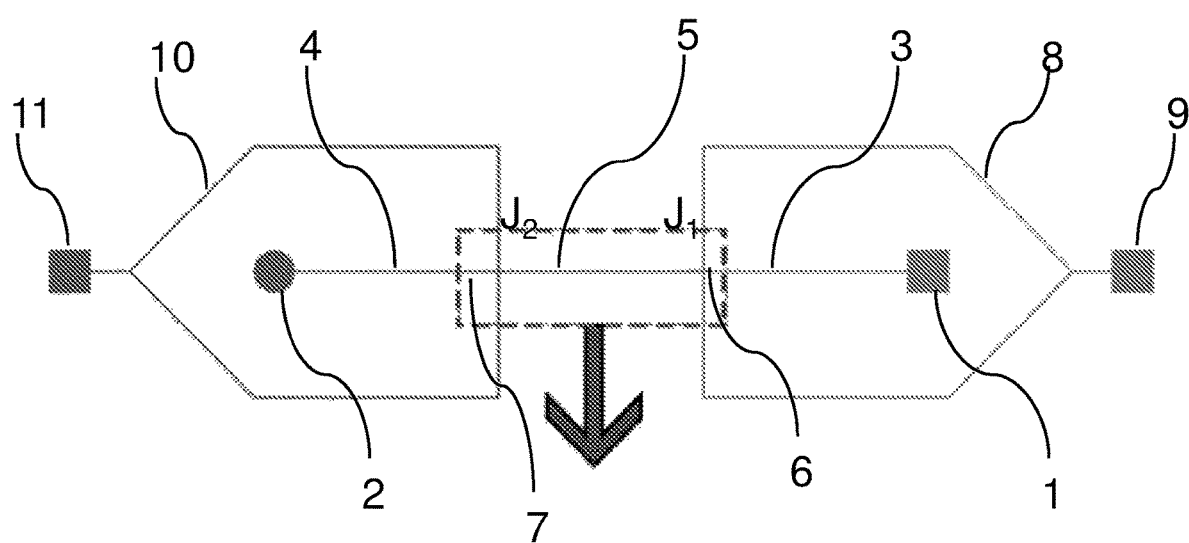
FIG. 1 shows a schematic representation of an apparatus employed for multi-dimensional micro fluid focusing of a sample, according to an embodiment of the invention.

FIG. 1 shows a schematic representation of an apparatus employed for multi-dimensional micro fluid focusing of a sample, according to an embodiment of the invention. The arrangement includes a microchannel having an inlet 1 and an outlet 2. The inlet 1 defines a first region 3 and the outlet 2 defines a second region 4. A middle region 5 is formed in between the first region 3 and the second region 4. A first junction 6 is formed at an intersection of the first region 3 and the middle region 5. A second junction 7 is formed at an intersection of the middle region 5 and the second region 4. A first sheath 8 is positioned proximal to the first junction 6. A second sheath 10 is positioned at the second junction 7. In one example of the invention, the first sheath and the second sheath are provided with independent inlets. The first sheath 8 is provided with a sheath inlet 9. The second sheath 10 is provided with a sheath inlet 11.

In an alternate embodiment of the invention, the first sheath and the second sheath are formed to have a common inlet. In one example of the invention, the microchannel along with the inlets is formed out of a Polydimethylsiloxane, hereinafter referred to as PDMS. Additionally the sheaths also can be formed out of the PDMS.

Figure 2:
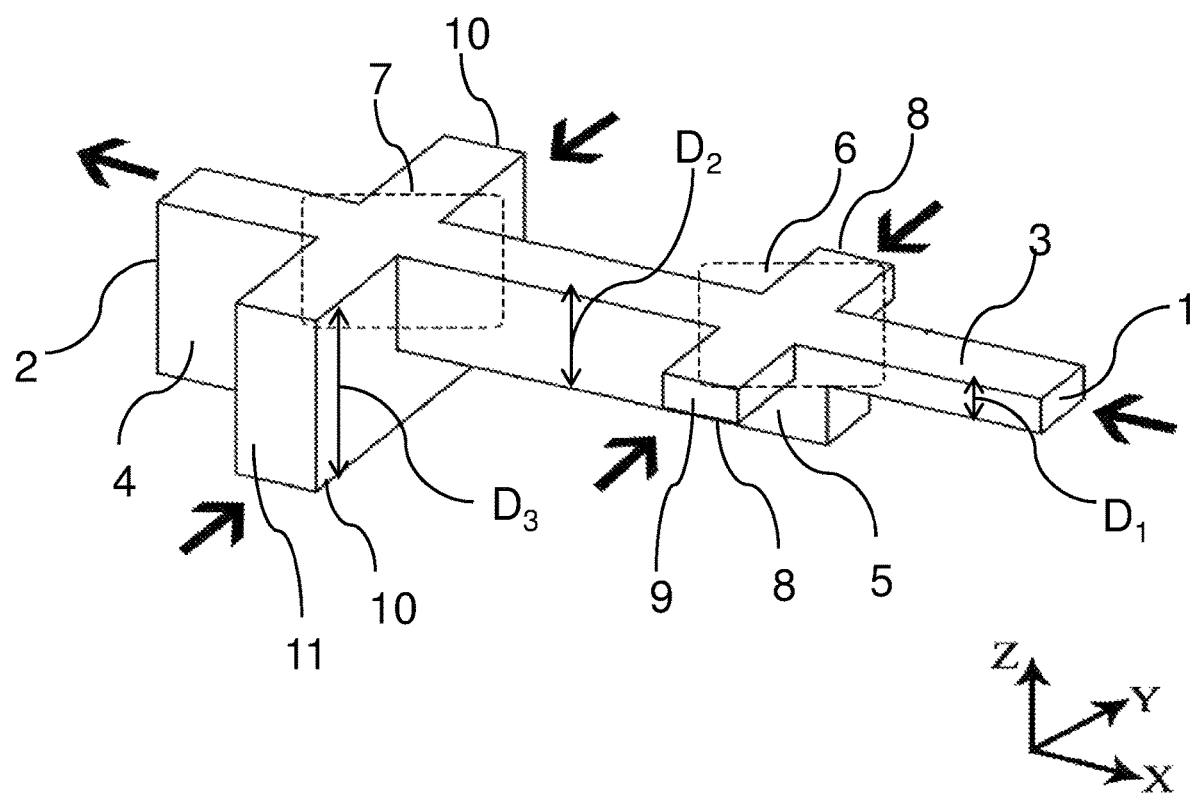
FIG. 2 shows a perspective view of the multi-dimensional micro fluid focusing device, according to an embodiment of the invention.

FIG. 2 shows a perspective view of the multi-dimensional micro fluid focusing arrangement, according to an embodiment of the invention. The first region 3 has a depth $D_1$ and the middle region 5 has a depth $D_2$. In one example of the invention, the depth $D_2$ of the middle region 5 is greater than the depth $D_1$ of the first region 3. The second region 4 has a depth $D_3$ and is greater than the depth $D_2$ of the middle region 5.

Figure 3:
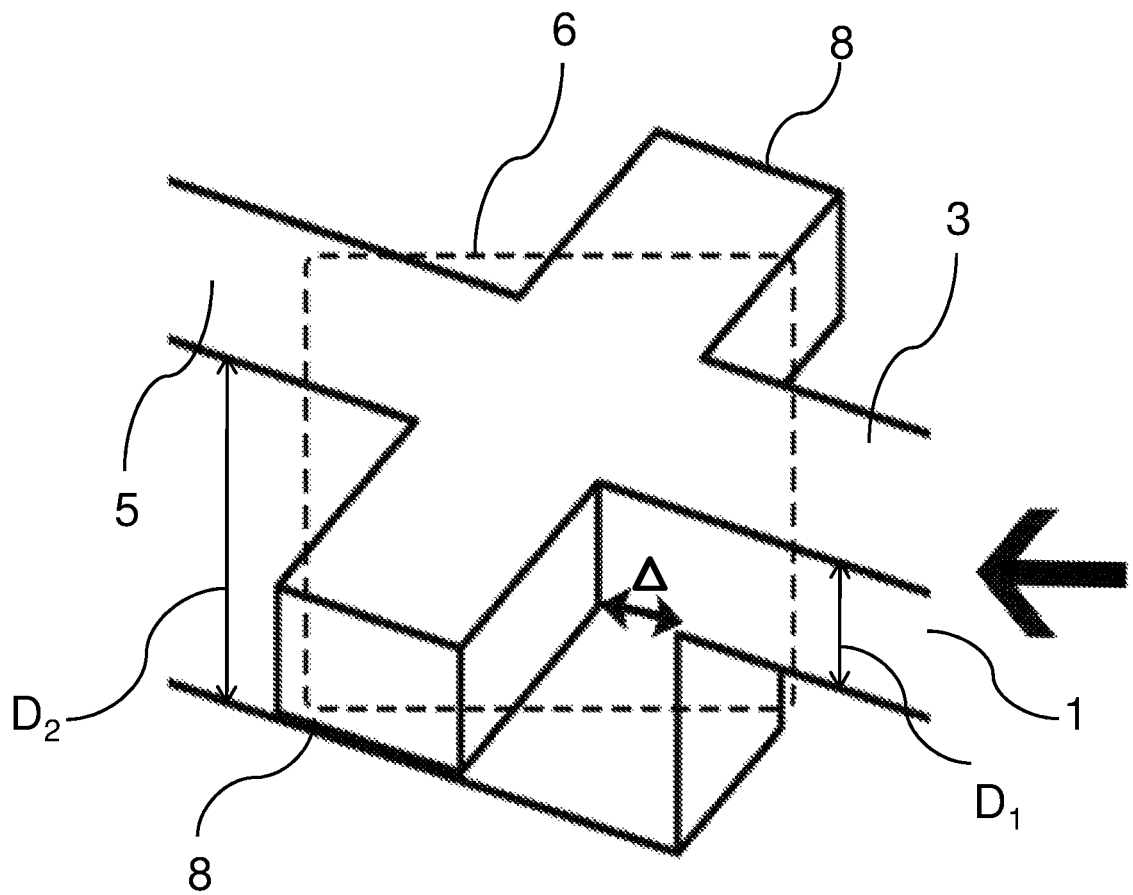
FIG. 3 shows a perspective view of an enlarged region of the first junction, according to an embodiment of the invention.

FIG. 3 shows a perspective view of an enlarged region of the first junction 6, according to an embodiment of the invention. The depth $D_1$ of the first sheath 8 can be varied, wherein the variable depth is dependent on the depth $D_1$ of the first region 3. In one example of the invention, the position of the first sheath 8 is offset by a distance, to the position of the first junction 6.

Figure 4:
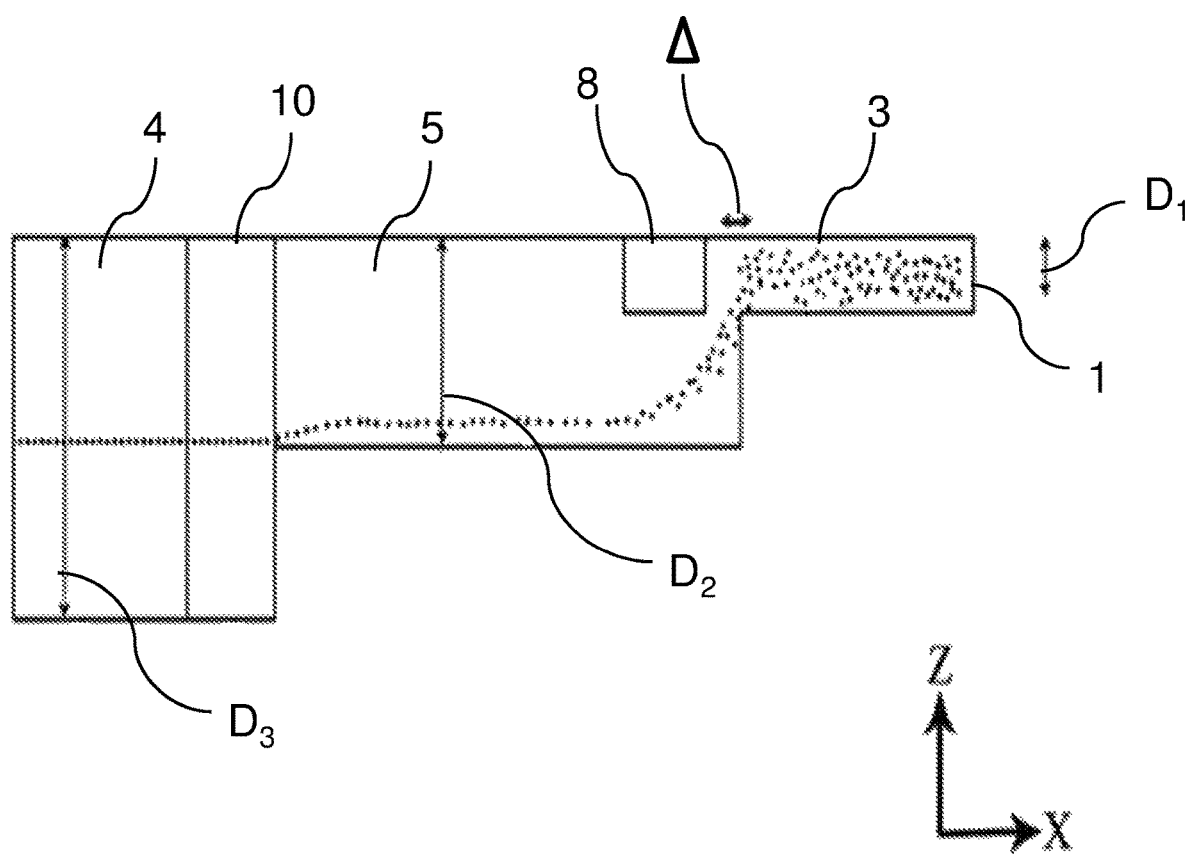
FIG. 4 shows a side view of the arrangement showing the multi-dimensional micro fluid focusing, according to an embodiment of the invention.

FIG. 4 shows a side view of the arrangement showing the multi-dimensional micro fluid focusing, according to an embodiment of the invention. Initially, a sample fluid and a sheath fluid are introduced. The sample fluid is introduced into the inlet 1. The sheath fluid is introduced into the sheath inlet 8 and the sheath inlet 10. The introduced sample fluid passes from the first region 3 to the second region 4 through the middle region 5. The junctions 6 and 7 formed along with the positioning of the sheaths 8 and 10 enable the focusing of the particles. The offset in the position of first sheath 8 provides in plane focusing of the particles of the fluid.

Figure 5:
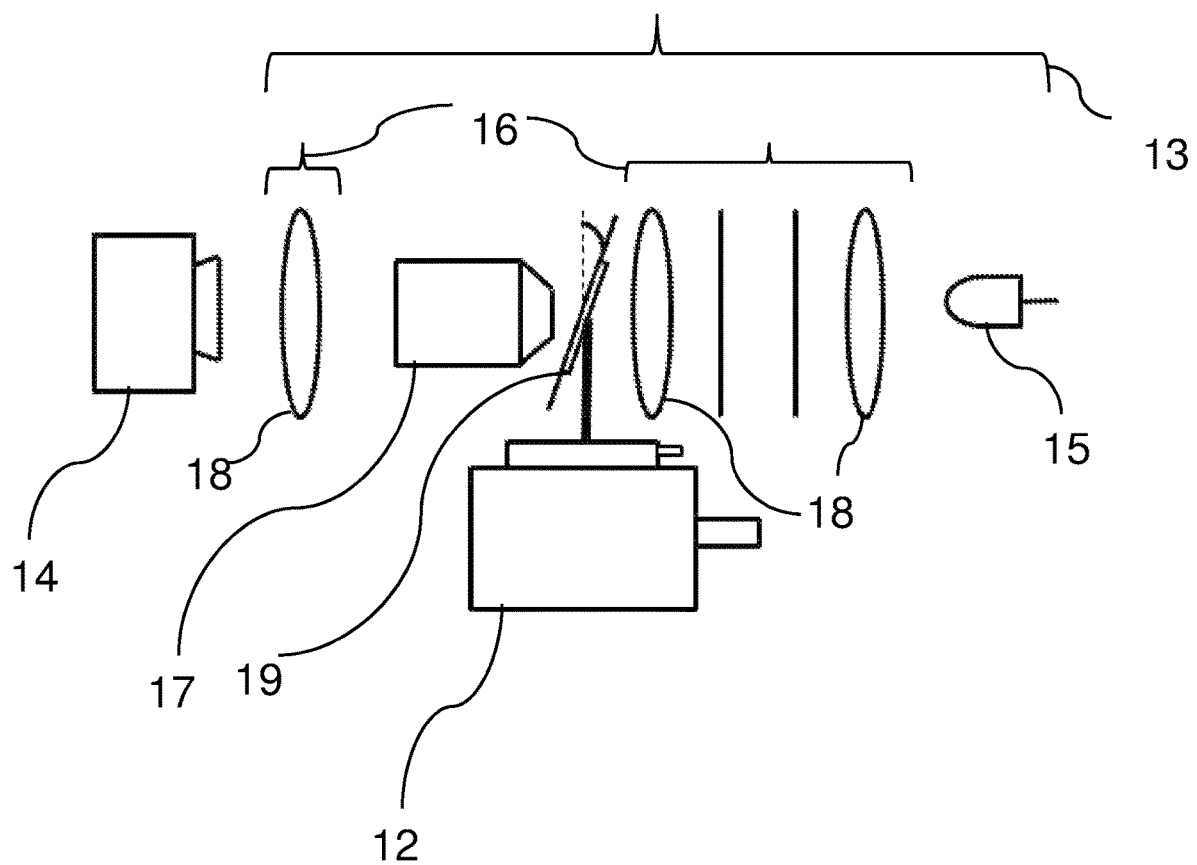
FIG. 5 shows a schematic representation of an analyser unit, according to an embodiment of the invention.

FIG. 5 shows a schematic representation of an analyser unit, according to an embodiment of the invention. The analyser includes a holder 12, a microscope 13 and a recording unit 14. The microscope 13 is positioned across the holder 12. The microscope 13 is provided with an optical source 15 for illumination. The optical source 15 is selected for illumination in the visible region of the electromagnetic spectrum. In one example of the invention, the optical source 15, selected is a LED, emitting a wavelength of 630 nm. An auxiliary optical unit 16 is coupled to the optical source 15. A micro objective 17 is coupled to the auxiliary optical source 16. The auxiliary optical unit 16 includes an arrangement of lenses 18. The arrangement is for enabling Kohler illumination. The microscope 13 is capable of executing translational and/or rotational motion. In one example of the invention, the translational and/or rotational motion is enabled by providing exclusive stages coupled with mechanical elements. The recording unit 14 is coupled to the micro objective 17. The recording unit 14 is any one selected from the list including but not limited to a spectrometer, a spectrograph and a camera. The holder 12 is employed for removably retaining the apparatus 19. The holder 12 is capable of executing a planar movement along the axis of the mounting of the holder. The holder 12 is inclined at an angle with respect to a line of illumination from the optical source 15. In one example of the invention, the angle is 2° C. In another example of the invention, the angle is 4° C. The angle varies from about 2° C. to about 90° C.

The device as explained in detail herein above is employed for focusing of fluid. In one example of the invention, the device is employed for focusing of red blood corpuscles, RBC. The device is utilized to calculate the tightness of focus of RBCs in the apparatus along the depth direction at a fixed sample and sheath flow rates.

Figure 6:
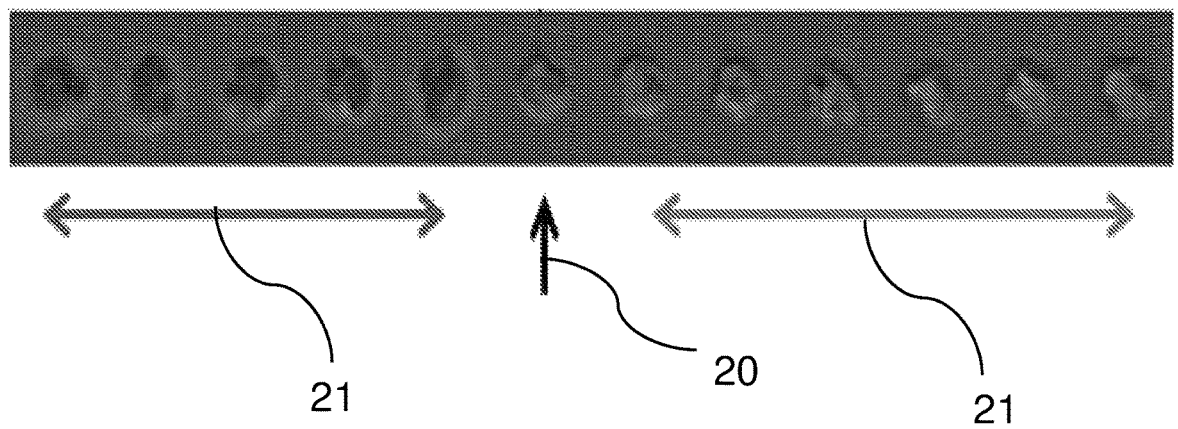
FIG. 6 shows a focus stack captured for an RBC inflow at the best position in the middle region, according to an example of the invention.

FIG. 6 shows a focus stack captured for an RBC inflow at the middle region, according to an example of the invention. The RBC is extracted from fresh venous blood. The sample fluid is introduced into the sample inlet. The RBC images are captured at a frame rate 1000 fps and at an exposure time of 50 s as it passes through the apparatus. The apparatus placed on the holder is tilted by an angle of 2 degree with respect to the plane of focus of microscope. The focus stack captured for a RBC inflow in middle region is of size 30×30 pixels. The best focused location for the best focused image 20 is located in the middle region. The out of focused location results in providing out of focused images 21.

Figure 7:
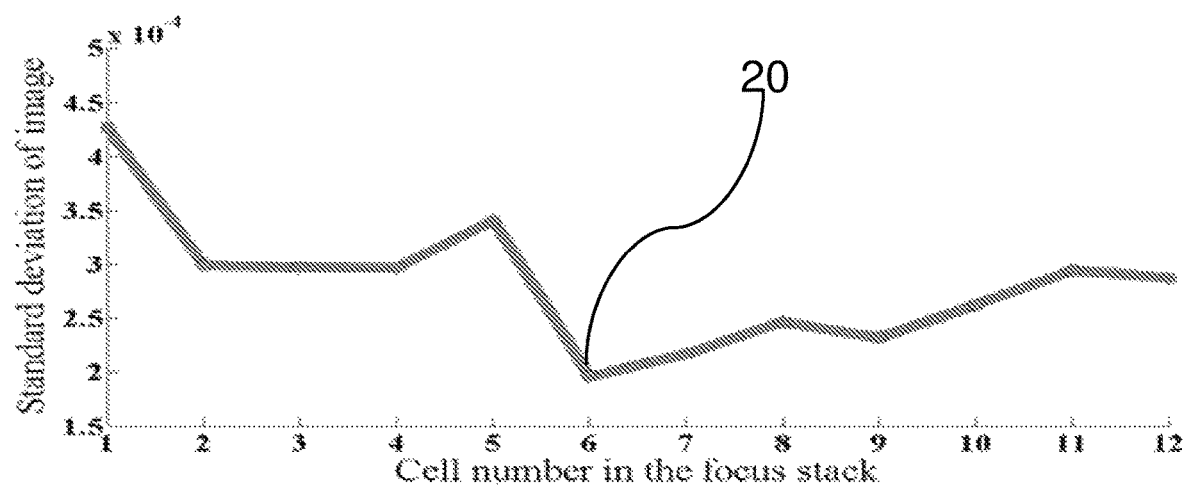
FIG. 7 shows a graph depicting a variation of standard deviation of each RBC image in a focus stack, according to an example of the invention.

FIG. 7 shows a graph depicting a variation of standard deviation of each RBC image in a focus stack, according to an example of the invention. The best location depends on the variation of a standard deviation of each image in the focus stack with the image location. The graph infers that the location of best focused image corresponds to the image with least standard deviation from the focus stack.

Figure 8A:
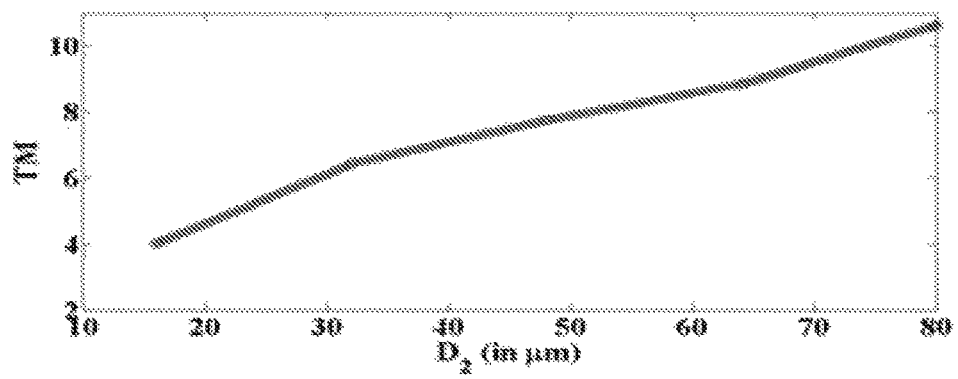
FIG. 8 (a) illustrates a graph of effect of the depth of the middle junction on tightness of focusing, according to an example of the invention.
FIG. 8(c) illustrates a graph of effect of offset of the first sheath on a tightness of focusing, according to an example of the invention.
Figure 8B:
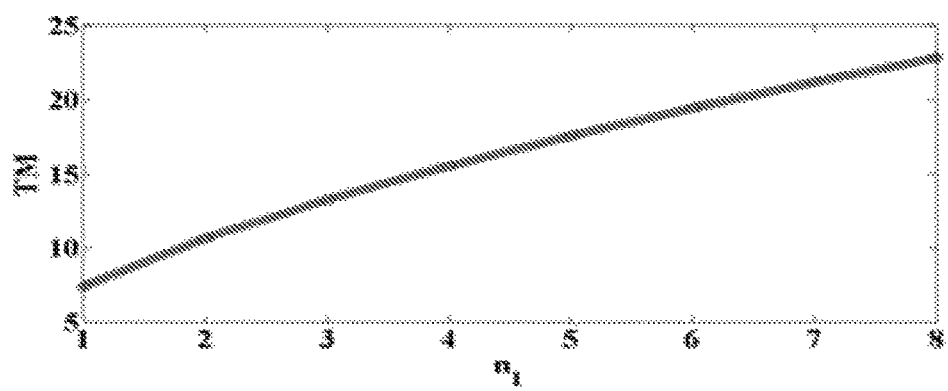
Figure 8C:
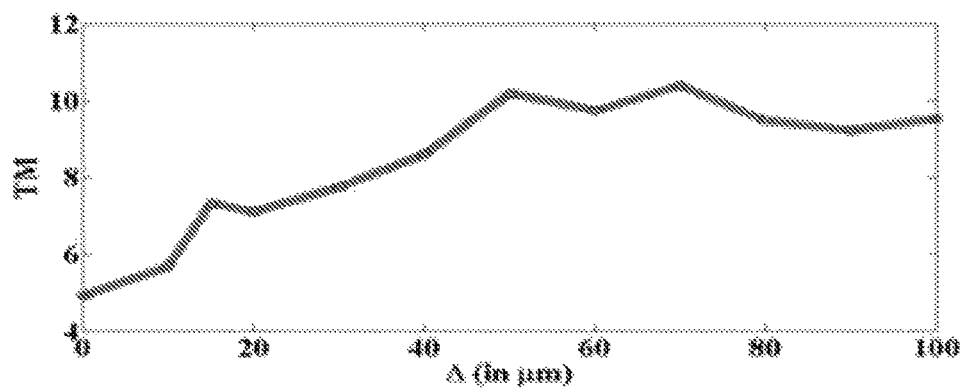

FIG. 8 (*a*) illustrates a graph of effect of the depth of the middle junction on a tightness of focusing, according to an example of the invention. The normal inflow velocity ratio of first sheath $n_1$ is defined as the ratio of normal inflow velocity of first sheath to that of sample. The normal inflow velocity of first sheath is selected at a value equal to 2. The offset of the first sheath at the first junction is set at a value of 30 µm.

FIG. 8 (*b*) illustrates a graph of effect of normal inflow velocity ratio of the first sheath on a tightness of focusing, according to an example of the invention. The depth of the middle region $D_2$ is set at a value equal to five times the depth of the first region $D_1$. The offset of the first sheath at the first junction is 30 µm.

FIG. 8(*c*) illustrates a graph of effect of offset of the first sheath on a tightness of focusing, according to an example of the invention. The normal inflow velocity ratio $n_1$ of first sheath is selected at a value of 2. The depth of the middle region $D_2$ is set at a value equal to three times the depth of the first region $D_1$.

Figure 9A:
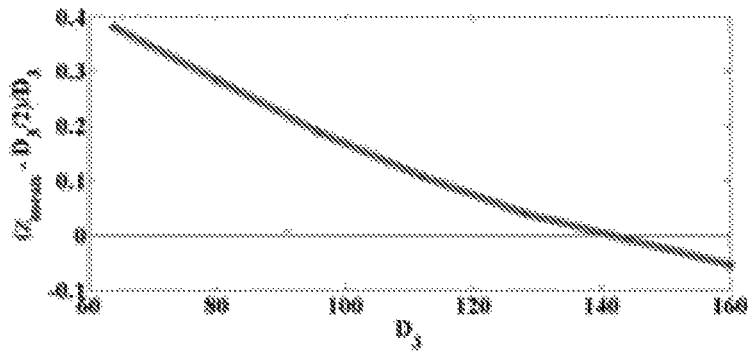
FIG. 9 (a) illustrates a graph of variation of a line of focusing, with respect to depth of second region, according to another example of the invention.
FIG. 9(c) illustrates a graph of variation of standard deviation of a particle from a line of focusing with respect to normal average inflow velocity ratio of second sheath, according to another example of the invention.
Figure 9B:
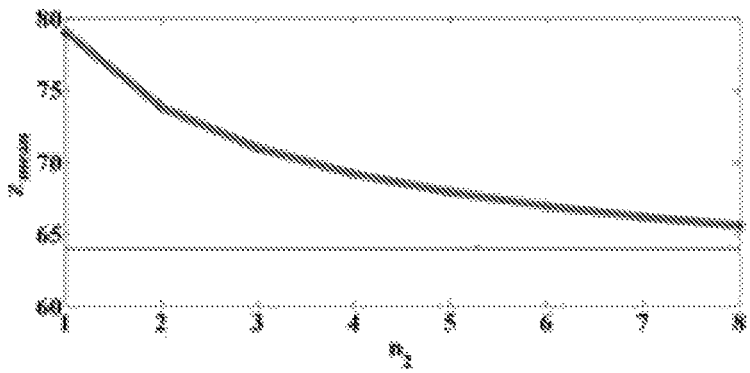

FIG. 9 (*a*) illustrates a graph of variation of a line of focusing, with respect to depth of second region, according to another example of the invention. The variations are obtained by selecting the parameter value as mentioned. The normal inflow velocity ratio of the second sheath $n_2$, defined as the ratio of normal inflow velocity of second sheath to that of sample and is selected to a value of 4. The depth of the middle region is selected at a value of 64 µm. The normal inflow velocity ratio of first sheath is selected a value of 8. The offset is selected a value of 15 µm.

FIG. 9 (*b*) illustrates a graph of variation of a line of focusing with respect to normal inflow velocity ratio of second sheath $n_2$, according to another example of the invention. The variations are obtained by selecting the parameter value as mentioned. The depth of the second region is selected a value of 128 µm. The depth of the middle region is selected a value of 64 µm. The normal inflow velocity ratio of first sheath is selected a value of 8. The offset is selected a value of 15 µm.

Figure 9C:
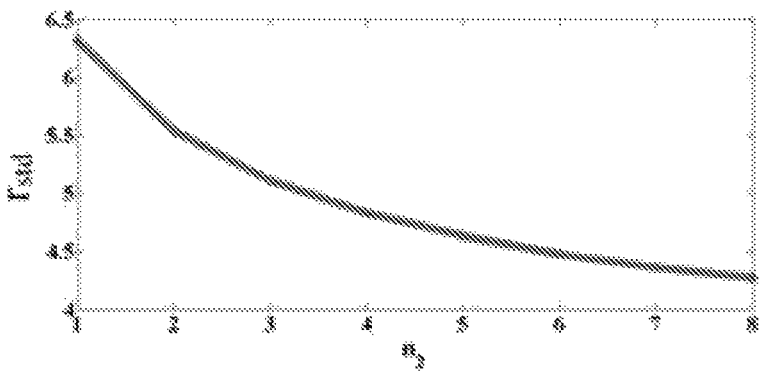

FIG. 9(c) illustrates a graph of variation of standard deviation of a particle from a line of focusing with respect to normal inflow velocity ratio of second sheath, according to another example of the invention.

The variations are obtained by selecting the parameter value as mentioned. The depth of the second region is selected to a value of 128 µm. The depth of the middle region is selected a value of 64 µm. The normal inflow velocity ratio of first sheath is selected a value of 8. The offset is selected a value of 15 µm.

Figure 10A:
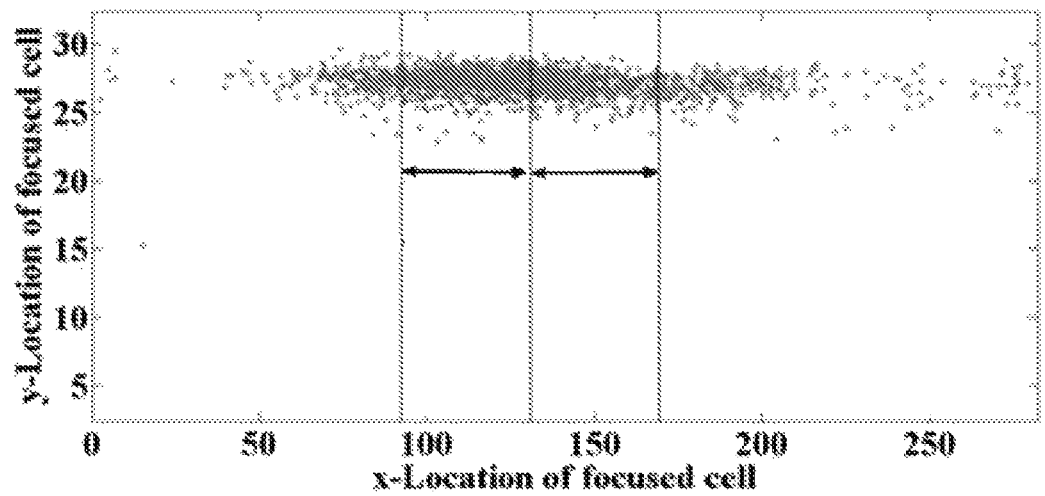
FIG. 10 (a) illustrates a graph representing the position of focused cells in a middle region for a given tilt of a microfluidic device, according to an example of the invention.

FIG. 10(a) illustrates a graph representing the position of focused cells in a middle region for a given tilt of a microfluidic device, according to an example of the invention. The plot represents the position of focused cells in the middle region for a given tilt of the apparatus. In one example of the invention the apparatus is given a tilt of 2 degree.

Figure 10B:
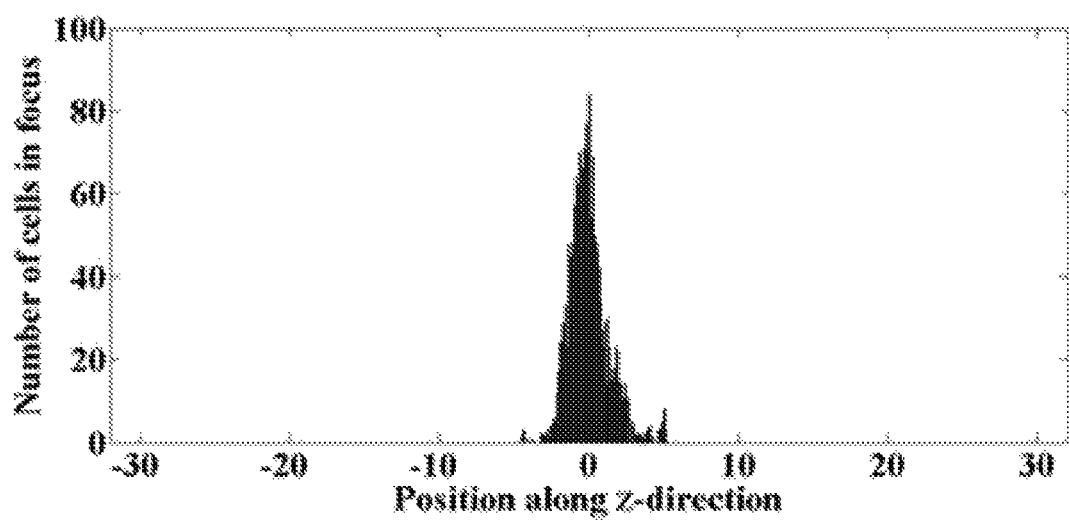

FIG. 10(b) illustrates a histogram representing a variation of a focusing depth of the cells along a y-direction with respect to a mean plane of focusing of the cells, according to an example of the invention. The histogram corresponds to the strength of focusing of the focused cells in the middle region.

The invention as explained herein through the examples and the appended drawings can be utilized in various application areas.

Examples of areas of application include but are not limited to Mixing of fluids; Sorting of particles; introduction of rotation of particles; controlled synthesis of nanoparticles; estimating physical properties of particles. The invention, as described herein can also be adopted for applications where there is a need to collect side scatter or forward scatter or fluorescence or absorption of the sample. Further, the invention can also be adopted to produce tunability in refractive index of optical/non-optical components that use fluids.

The invention as described herein provides a multi-dimensional micro fluid focussing device. The device includes an apparatus for focussing the fluid and an analyser. The apparatus is easy to fabricate and is capable of handling various flow rates. Further, the apparatus advantageously provides sheaths formed at the junctions of varying depths of the microchannel. The sheaths enable regulation of flow rates and the varying depths of the microchannel enable multi dimensional focusing of the fluid. The analyser provided enables simple but robust analysis of the focused fluid that enables analyses of analytes present in the fluid.

The foregoing description of the invention has been set merely to illustrate the invention and is not intended to be limiting. Since modifications of the disclosed embodiments incorporating the spirit and substance of the invention may occur to person skilled in the art, the invention should be construed to include everything within the scope of the appended claims and equivalents thereof.

We claim:

1. A microfluidic device for multi-dimensional fluid focusing, the device comprising:
    a microchannel having a first region configured with a sample fluid inlet, the first region defining a first depth D1, a middle region defining a second depth D2 wherein the second depth D2 is greater than the first depth D1, a second region configured with an outlet the second region defining a third depth D3 and the third depth D3 is greater than the second depth D2, the difference in depths between D1, D2, and D3 providing a varying depth in the microchannel;
    a first sheath with a sheath inlet for a sheath fluid having a sheath depth lesser than the second depth D2 configured for a first focusing of the sample fluid, wherein the position of the first sheath is offset to a first junction formed at the intersection of the first region and the middle region; and
    a second sheath with a second sheath inlet for a second sheath fluid configured for a second focusing of the fluid, wherein the second sheath is positioned at a second junction formed at the intersection of the middle region and the second region;
    wherein the varying depth of the microchannel along with the offset positioning of the first sheath with respect to the second sheath enables multi-dimensional focusing of the sample fluid.

2. The device of claim 1, wherein the offset in the position of first sheath provides an in-plane focusing of the sample, wherein the in-plane focusing is along the length of the microchannel.

3. The device of claim 1, wherein the second sheath provides focusing of the sample along one axis of the plane, wherein the one axis is along the direction of the sample fluid flow.

4. The device of claim 1, wherein the second sheath enables focusing of the fluid along a central line with respect to the microchannel, wherein the position of the central line is adjustable by configuring the flow rates of sheath fluid and sample fluid.

5. The device of claim 1, wherein the second sheath enables regulation of line of focusing of the fluid along the depth of the microchannel.

6. The device of claim 5, wherein the regulation of the line of focusing is achieved by regulating the rate of flow of the fluid.

7. The device of claim 1, wherein the device is additionally provided with an analyser, comprising:
    a holder for removably retaining the device, wherein the holder is configured for a planar movement;
    a microscope positioned across the holder, wherein the microscope is configured for a translational and/or rotational motion; and
    a recording unit coupled to the microscope.

8. The device of claim 7, wherein the microscope has an optical source configured for the visible region of the electromagnetic spectrum;
    an auxiliary optical unit coupled to the optical source; and
    a micro objective.

9. The device of claim 8, wherein the auxiliary optical unit comprises of an arrangement of lenses for enabling Kohler illumination.

10. The device of claim 7, wherein the recording unit is one selected from the list comprising of a spectrometer, a spectrograph and a camera.

11. The device of claim 7, wherein the holder is inclined at an angle in the range of about 2° C. to about 90° C. with respect to a line of illumination from the optical source.

* * * * *